US007991902B2

(12) United States Patent
Cross et al.

(10) Patent No.: US 7,991,902 B2
(45) Date of Patent: Aug. 2, 2011

(54) REPUTATION-BASED AUTHORIZATION DECISIONS

(75) Inventors: David Cross, Redmond, WA (US); Scott Field, Redmond, WA (US); Varugis Kurien, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/608,757

(22) Filed: Dec. 8, 2006

(65) Prior Publication Data

US 2008/0141366 A1 Jun. 12, 2008

(51) Int. Cl.
*G06F 15/16* (2006.01)
*G06F 15/173* (2006.01)

(52) U.S. Cl. .......................... 709/229; 709/225
(58) Field of Classification Search .......... 709/201–203, 709/217–232
See application file for complete search history.

(56) References Cited

U.S. PATENT DOCUMENTS

| 6,167,521 | A | 12/2000 | Smith et al. | |
|---|---|---|---|---|
| 6,233,576 | B1 * | 5/2001 | Lewis | 707/9 |
| 6,256,393 | B1 | 7/2001 | Safadi et al. | |
| 6,321,334 | B1 * | 11/2001 | Jerger et al. | 726/1 |
| 6,330,549 | B1 | 12/2001 | Merkle | |
| 6,473,800 | B1 * | 10/2002 | Jerger et al. | 709/226 |
| 6,647,388 | B2 * | 11/2003 | Numao et al. | 707/9 |
| 6,651,168 | B1 | 11/2003 | Kao et al. | |
| 6,954,792 | B2 | 10/2005 | Kang et al. | |
| 7,017,051 | B2 | 3/2006 | Patrick | |
| 2002/0046041 | A1 | 4/2002 | Lang | |
| 2003/0037239 | A1 | 2/2003 | Leung et al. | |
| 2003/0051169 | A1 * | 3/2003 | Sprigg et al. | 713/201 |
| 2005/0021733 | A1 * | 1/2005 | Clinton et al. | 709/224 |
| 2005/0055565 | A1 * | 3/2005 | Fournet et al. | 713/200 |
| 2006/0031483 | A1 | 2/2006 | Lund et al. | |
| 2006/0150256 | A1 * | 7/2006 | Fanton et al. | 726/27 |
| 2007/0256133 | A1 * | 11/2007 | Garbow et al. | 726/26 |

OTHER PUBLICATIONS

Fleischman, "Code Signing", retrieved on Aug. 17, 2006 at <<http://www.cisco.com/web/about/ac123/ac147/archived_issues/ipj_5-1/code_signing.html>>, Cisco Systems, Inc., The Internet Protocol Journal, vol. 5, No. 1, 1992-2006, pp. 1-6.

Lee, et al., "An Adaptive Authentication Protocol based on Reputation for Peer-to-Peer System", retrieved at <<http://caislab.icu.ac.kr/Paper/paper_files/2003/SCIS2003/9B-4(Hyunrok%20Lee).pdf>>, Symposium on Cryptography and Information Security, Japan, Jan. 26-29, 2003, The Institute of Electronics, Information Communication Engineers, pp. 06.

"Microsoft Technet Internet Explorer 5.0 Resource Kit: Digital Certificates" retrieved on Aug. 17, 2006, at <<http://www.microsoft.com/technet/prodtechnol/ie/reskit/5/part1/ch06digi.mspx?mfr=true>>, Microsoft Corporation, 2006, pp. 13.

Shieh, et al., "A Software Authorization and Protection Model for Mobile Code Systems", retrieved at <<http://dsns.csie.nctu.edu.tw/ssp/docs/A%20Software%20Authorization%20and%Protection.pdf#search=%22code%20signing%20authorization%20%20loading%20software%22>>, National Chiao Tung University, Hsinchu, Taiwan, pp. 1-26.

Chinese Office Action mailed Mar. 3, 2011 for Chinese Patent Application No. 200780045416.3, a counterpart foreign application of U.S. Appl. No. 11/608,757.

* cited by examiner

*Primary Examiner* — Yasin Barqadle
(74) *Attorney, Agent, or Firm* — Lee & Hayes, PLLC

(57) ABSTRACT

This document describes tools capable of receiving reputation metadata effective to enable better decision making about whether or not to authorize operations. The tools may build a reputation value from this reputation metadata and, based on this value and an authorization rule, better decide whether or not to authorize an operation requested by some program, application, or other actor.

14 Claims, 5 Drawing Sheets

REPUTATION-BASED AUTHORIZATION DECISIONS

BACKGROUND

Access control systems authorize programs and applications to perform operations, such as authorizing a software package downloaded via the Internet to read, write, or open a file located on a user's computer. Traditionally, access control systems decide whether or not to authorize an operation by referencing an access control list, a look-up list, or the like.

These lists, however, often employ schemas that are fixed and offer few capabilities. These schemas, for example, may do little more than look at a user's identity in deciding whether or not to allow a requested operation. In so doing, they may allow an untrustworthy software package (e.g., the above-mentioned Internet-downloaded software package) to do anything it likes so long as it is running on the user's computer under the user's identity. In such cases the user's identity effectively controls the decision to authorize the package's requested operation.

SUMMARY

This document describes tools capable of receiving reputation metadata effective to enable better decision making about whether or not to authorize operations in a computing system. The tools may build a reputation value from this reputation metadata and, based on this value and an authorization rule, better decide whether or not to authorize an operation requested by some program, application, or other actor.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools having the above-mentioned capabilities and capable of building a reputation value of an actor, building an authorization input based at least in part on the reputation value, comparing the authorization input to an authorization policy, and making authorization decisions based on the comparison. Two exemplary environments in which the tools may enable these and other actions are set forth below in a section entitled Exemplary Operating Environments. Another section follows, entitled Reputation Value Builder, which describes one exemplary way in which the tools may act to create an actor's reputation value from reputation metadata. A fourth section, entitled Authorization Input Builder, describes how the tools may operate to build an authorization input from the actor's reputation value. A fifth section, entitled Authorization Module, discusses manners in which the tools may act to make authorization decisions based on the authorization input indicative of the actor's reputation value. A final section, entitled Exemplary Implementation, describes one non-limiting way in which the claimed tools may collectively operate. This overview, including these section titles and summaries, is provided for the reader's convenience and is not intended to limit the scope of the claims or the entitled sections.

Exemplary Operating Environments

Before describing the tools in detail, the following discussion of exemplary operating environments is provided to assist the reader in understanding some ways in which various inventive aspects of the tools may be employed. The environments described below constitute but two examples and are not intended to limit application of the tools to any particular operating environment. Other environments may be used without departing from the spirit and scope of the claimed subject matter.

Figure 1:
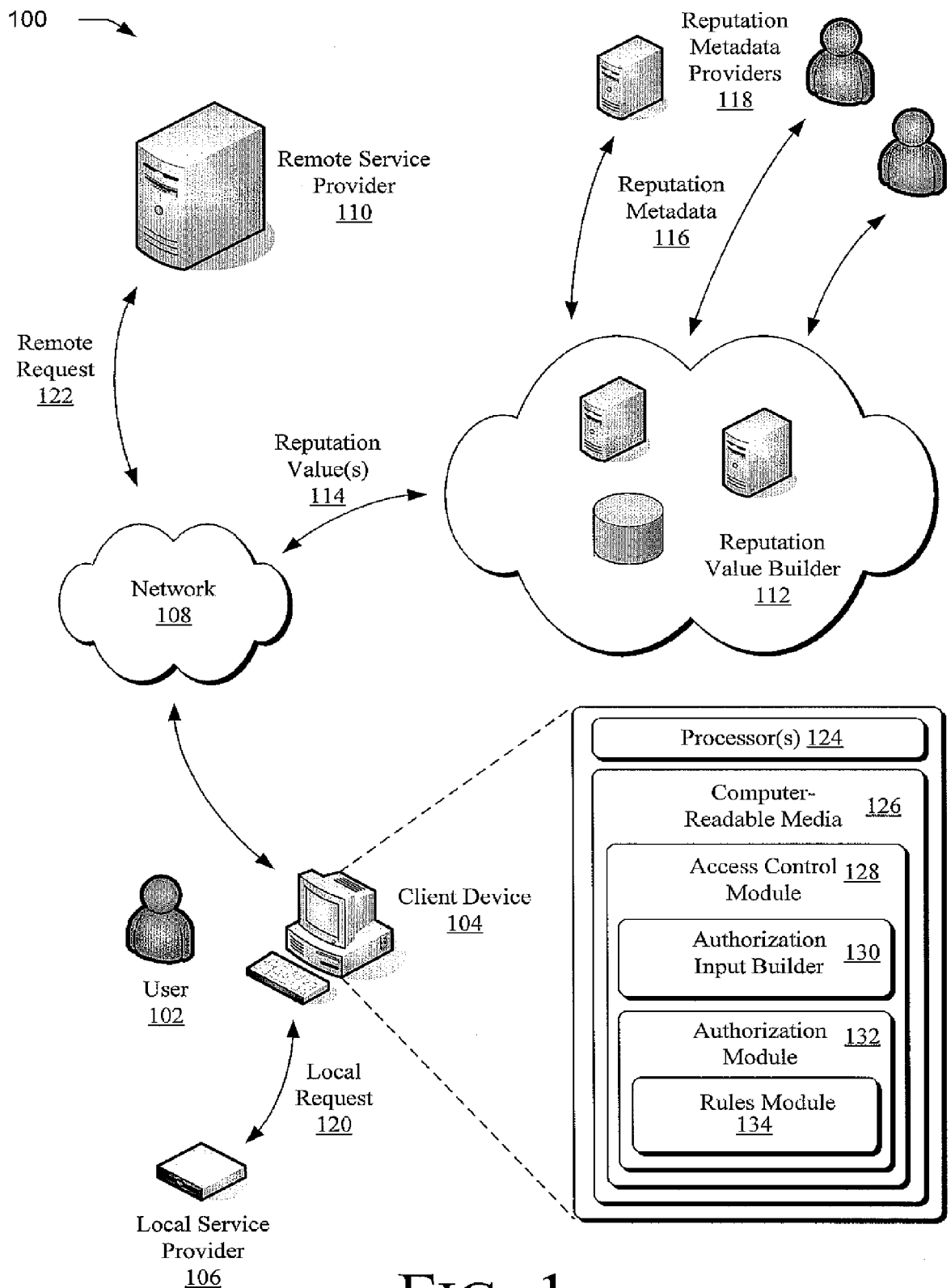
FIG. 1 illustrates an exemplary operating environment having a reputation value builder and in which various embodiments of the tools may operate.

FIG. 1 illustrates one such operating environment generally at 100 in which a user 102 may operate a client device 104. Client device 104 is generally a computing device, such as a personal computer, and may include a local service provider 106. Local service provider 106 may be integral with, accessible by, or separate from client device 104. In some instances, local service provider 106 may comprise a disk drive, flash memory drive, zip drive, or any other device capable of coupling to computer-readable media. For example, local service provider 106 may comprise a CD/DVD drive, in which a computer-readable medium including a software application may be inserted and executed.

Client device 104 may connect via a network 108 to a remote service provider 110. Remote service provider 110 may comprise a server or the like, from which the user and the client device may download a software application, program, or other actor capable of requesting an operation. The client device may also connect via the network to a reputation value builder 112. As described in detail below, the reputation value builder may build a reputation value 114 usable in making an authorization decision.

As illustrated, the reputation value builder may receive reputation metadata 116 from one or more reputation metadata providers 118. Reputation metadata 116 may comprise any information associated with a reputation metadata provider's estimation of an actor's reputation. An actor may include a software program, application, dynamically linked library, installation program, file, picture, document, applet, ActiveX control, or any other code capable of executing on software or hardware. Reputation metadata providers 118, meanwhile, may comprise any person or device capable of estimating, judging, or valuing the reputation of an actor.

The reputation metadata provider, for example, may itself comprise a software program or the like, while another reputation metadata provider may comprise a person who has used the actor being judged. More specifically, a reputation metadata provider of the first type could comprise a security application, which could provide reputation metadata in response to an independent review and analysis of the actor being judged. The latter reputation metadata provider, meanwhile, could comprise a member of an online community. In this example, individual members of an online community may judge or vote on the reputation of a particular actor. If these members have had positive experiences with the actor, then these members may provide reputation metadata 116 that speaks positively to that actor's reputation. Of course, if these members have had negative experiences, then these members may provide reputation metadata 116 that speaks negatively about that actor.

In embodiments where reputation value builder 112 receives reputation metadata from multiple reputation metadata providers, the reputation value builder may aggregate the reputation metadata. In some instances, the reputation value builder creates and outputs a reputation value that represents an average of the received reputation metadata 116. Furthermore, while a single reputation value builder is shown, multiple reputation value builders may exist and be utilized in making authorization decisions. In these instances, each reputation value may be compiled together to form an aggregate reputation value.

In the exemplary environment 100, the user may wish to allow an actor to run on client device 104. This actor may be run from the local service provider 106 or from remote service provider 110. In the former case, the actor may make a local request 120 to perform some operation on an object of client device 104. This object may comprise a file, document, picture, or any other data located on or accessible by client device. For instance, the actor may request via local request 120 to read, write, or open a file located on client device 104. Similarly, when the software application or the like is run from remote service provider 110, the actor may make a remote request 122 to perform some operation on some object located on or accessible by the client device. As discussed in detail below, the client device may first seek to verify the reputation of the actor before granting or denying permission to the actor to perform the requested operation.

With this overview in mind, this document now describes the contents of the client device, which are useful for the following discussion. As illustrated, the client device includes one or more processors 124 and one or more computer-readable media 126. In the illustrated embodiments, computer-readable media 126 includes an access control module 128, which may serve to grant or deny access to actors seeking contact with certain objects located on or accessible by client device 104.

Access control module 128 may include an authorization input builder 130 and an authorization module 132. Authorization input builder 130 may serve to receive reputation values 114, as well as other components discussed below, and create an authorization input for use in making authorization decisions. Authorization module 132, meanwhile, may include a rules module 134. Rules module 134 may implement local or remote authorization rules or policies for use in deciding whether or not to grant access to actors seeking permission. Authorization module 132 may receive the authorization input from authorization input builder 130 and compare the authorization input against one or more rules in the rules module. Depending upon the authorization input value as well as the configuration of the rules module, the authorization module may permit or deny the actor's request to perform a particular operation on a particular object requested. Other results may also occur, such as access control module 128 prompting the user to decide whether or not to allow the requested operation to occur. Furthermore, while the access control module is shown to be part of the client device, it can also be located remotely, possibly comprising a portion of reputation value builder 112.

As illustrated in FIG. 1 and discussed above, an actor may make either a local or remote request to perform some operation on an object. In response, client device 104 may request and reputation value builder 112 may provide a reputation value 114 indicative of the actor's reputation. This reputation value may then be provided to the access control module and possibly authorization input builder 130. In these embodiments, the authorization input builder may then use this value, as well as other components discussed below, to build an authorization input indicative of the actor's reputation. The authorization input may then be provided to the authorization module, which may compare the authorization input against rules within rules module 134. Authorization module 132 may then output an access or authorization decision as to whether or not to grant access to the actor, or whether to allow user 102 to decide. In embodiments where the access control module comprises a portion of the reputation value builder 112, the reputation value builder may itself simply provide the access or authorization decision to the client device.

Figure 2:
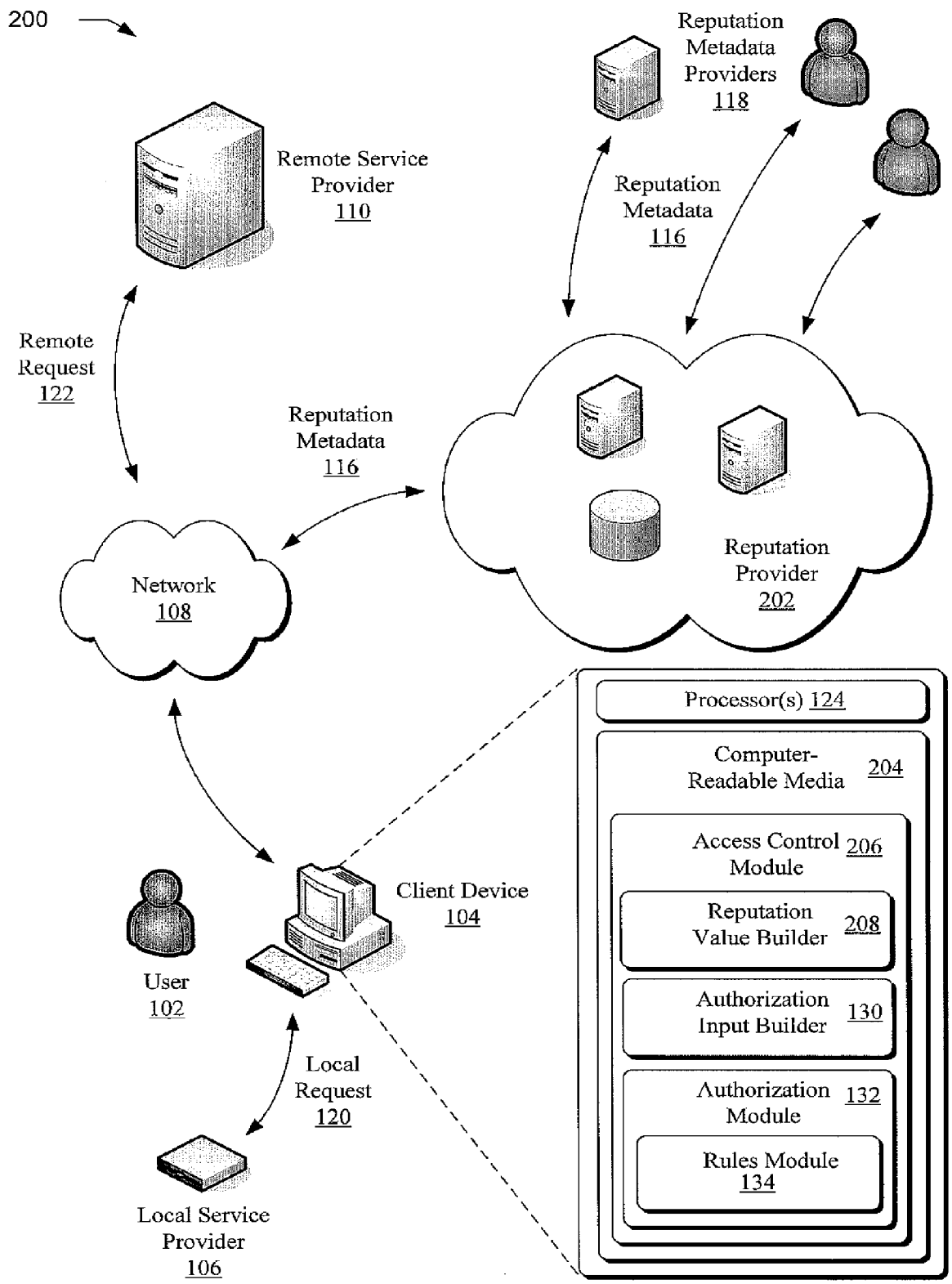
FIG. 2 illustrates another exemplary operating environment having a reputation provider and in which various embodiments of the tools may operate.

FIG. 2 illustrates another operating environment generally at 200 in which the claimed tools may also operate. FIG. 2 comprises many of the same elements as illustrated in and described with reference to FIG. 1. In environment 200, however, a reputation provider 202 may take the place of reputation value builder 112 of environment 100. Similar to reputation value builder 112, reputation provider 202 may receive reputation metadata 116 from reputation metadata providers 118. Here, however, reputation provider 202 may also output reputation metadata 116, possibly in response to a request from client device 104. Again, while a single reputation provider is shown, multiple reputation providers may exist and be utilized in making authorization decisions.

As illustrated, client device 104 may include one or more computer-readable media 204, which may itself include an access control module 206. Similar to access control module 128, access control module 206 may include authorization input builder 130, authorization module 132, and rules module 134. Access control module 206, however, may further include a reputation value builder 208. Reputation value builder 208 may function in a manner similar to that of reputation value builder 112. That is, the reputation value builder may receive reputation metadata 116 and create and output a reputation value.

Therefore, in these embodiments, an actor such as a software application may request to perform some operation upon an object located on or accessible by client device 104. In response, reputation metadata 116 compiled by reputation provider 202 may be provided to the client device. More specifically, reputation metadata 116 may be provided to reputation value builder 208, which may output a reputation value to authorization input builder 130. As discussed above, authorization input builder 130 may receive this reputation value and create an authorization input. The input may then be provided to authorization module 132, which may compare the input to one or more rules or policies within rules module 134. Authorization module 132 may then output an access or authorization decision, as discussed in detail below.

Reputation Value Builder

Figure 3:
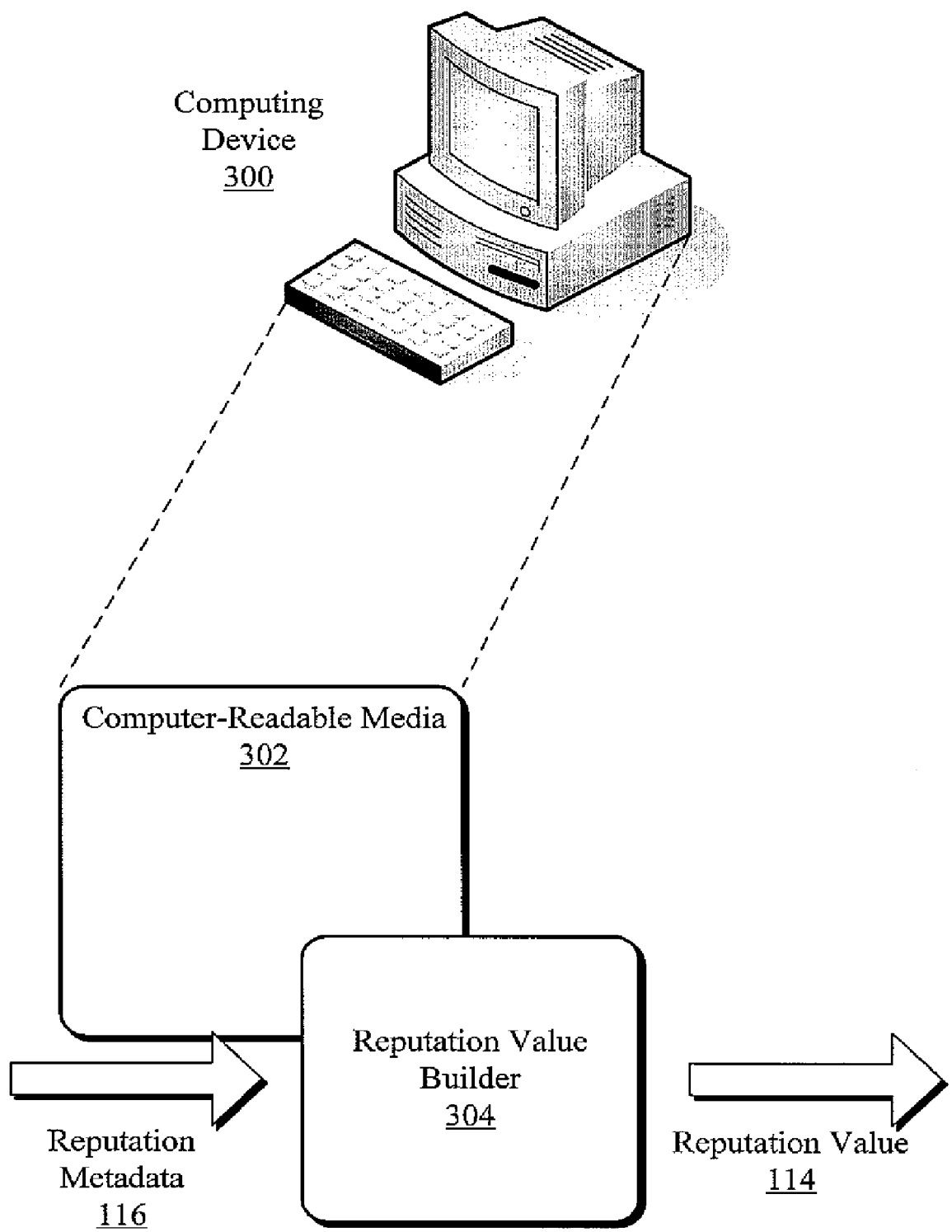
FIG. 3 illustrates an exemplary reputation value builder configured to receive reputation metadata and output a reputation value.

FIG. 3 illustrates a computing device 300 including one or more computer-readable media 302, which may couple to a reputation value builder 304. The reputation value builder may be integral with, accessible by, or separate from the computer-readable media. The reputation value builder may function in many of the ways discussed above in regards to reputation value builders 112 and/or 208. Furthermore, while FIGS. 1 and 2 illustrate that reputation metadata 116 is provided remotely, reputation metadata may also be provided locally at client device 104.

As illustrated in FIG. 3, reputation value builder 304 may receive reputation metadata 116. As discussed above in regards to reputation value builders 112 and 208, reputation value builder 304 may create and output reputation value 114, which is indicative of an actor's reputation. Again, reputation metadata 116 may come from one or more reputation metadata providers 118 or the like. Reputation metadata providers may be members of an online community or may be a software program capable of tracking actors' reputations via independent product review and analysis and operating on a computer entity. A reputation metadata provider 118 may also comprise a subscription program to which users must subscribe in order to receive reputation metadata 116 or reputation value 114. As such, an actor's reputation may evolve over time, as more community members or computing entities provide input pertaining to the actor's reputation. It is to be understood that while a few specific ways of compiling reputation metadata 116 have been provided, this information may be compiled in any way operable to collect metadata indicative of actors' reputations.

Reputation value builder 304 may either be located remotely in relation to a client device as shown in FIG. 1, or locally as shown in FIG. 2. In the former embodiments, the client device or some module running thereon may send a request for a reputation value pertaining to a certain actor. This request may include an attribute that uniquely identifies the actor for which a reputation value is desired. In some instances, this attribute may comprise a digitally signed attribute, such as a cryptographic message authenticator. In these instance—where the local client requests reputation information from one or more reputation builder(s)—the reputation builder(s) may provide the local client with one or more reputation values. Each builder may have already aggregated multiple pieces of reputation metadata 116 into a reputation value 114. If multiple builders exist, then the client device may compile them into an aggregate reputation value.

In embodiments utilizing a local rather than remote reputation value builder 304, the local reputation value builder may instead request reputation metadata 116 from one or more reputation providers 202. The local value builder may then compile and aggregate this metadata from one or more reputation providers 202 into a reputation value 114.

Reputation value builder 304 may display transitive qualities in some instances. In these instances, an actor requesting to perform some operation upon an object may merely comprise the leaf node of a chain of processes. In these instances, reputation value builder 304 may traverse the entire branch of calling modules that are related to the leaf node. For instance, envision that a user of a client device clicks on a hyperlinked picture, which results in an actor requesting to perform an operation on a local object. Reputation value builder 112 may therefore not only provide a reputation value for the picture, but it may also analyze the parent and/or grandparent processes running previous to the picture. In some instances, an individual reputation value may be provided for each node, while in other instances an aggregate result may be given for the entire branch.

Furthermore, reputation value 114 may be offered at varying levels of granularity. For example, in some instances a reputation value of an actor may be one of "good", "bad", or "unknown". As discussed in detail below in the section entitled Authorization Module, these varying values may help determine whether or not the actor should be granted the requested access. While reputation values may comprise these relatively simple values, they may also comprise a finer level of granularity. For instance, a reputation value of an actor could comprise one or more of the following:

Known malware
Possible spyware
Reported Trojan software
Software updated by vendor
Software obsoleted by vendor
Software no longer supported
Known security vulnerabilities
Patches for software available
85% positive reputation
23% negative reputation
23,234 installations
Digitally signed document by publisher
Source network address where software was obtained It is specifically noted that the above list comprises only a portion of possible reputation values. In any event, in some instances reputation value builder 304 may provide reputation value 114 to an authorization input builder. In these instances, the reputation value may form a portion of an authorization input for use in determining whether or not access should be granted to a requesting actor.

Authorization Input Builder

Figure 4:
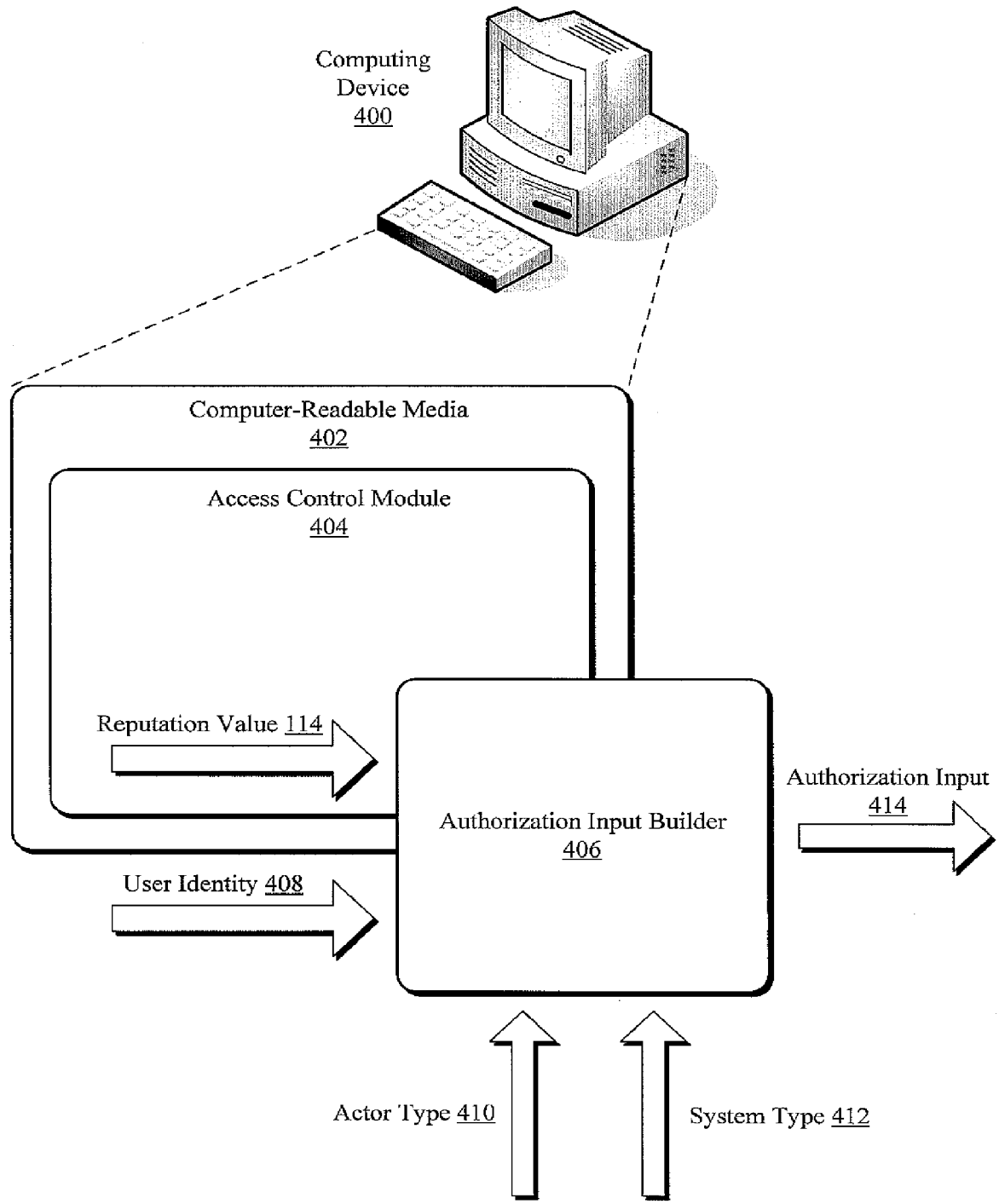
FIG. 4 illustrates an exemplary authorization input builder configured to receive a reputation value and create an authorization input.

FIG. 4 illustrates a computing device 400 including one or more computer-readable media 402, which is shown to include an access control module 404. Access control module 404 may couple to an authorization input builder 406, which may be integral with, accessible by, or separate from computer-readable media 402 and/or access control module 404. Authorization input builder 406 may comprise many of the same features as those described above in regards to authorization input builder 130.

As illustrated, authorization input builder 406 may receive reputation value 114, possibly from reputation value builders 112, 208 or 304. Authorization input builder 406 may also receive other inputs, such as a user identity 408, an actor type 410, and/or a system type 412. These additional inputs—along with reputation value 114—may help to form the output of authorization input 414. As discussed above, authorization input may comprise a result of these inputs and may be eventually compared to a rule or policy in order to determine whether or not an actor should be granted its requested access.

User identity 408 represents the identity of a user (e.g., 102) operating the client device (e.g., 104). User identify 408 contributes to the resulting value of authorization input 414, as different users may have different permissions. Actor type 410 refers to the nature of the actor requesting access. For instance, the actor type may comprise one or more of the following types: software application; installation program; dynamically linked library and/or installation program. Other types may also exist based on an object's label. Again, the actor type contributes to the resulting value of the authorization input 414, as different actor types may have different levels of permission. For instance, a File Transfer Protocol (FTP) actor type may be considered less trustworthy than an alternate software application such as a word processor. Of course, this may also be dependent on the system type 412, which refers to the type of system upon which the actor wishes to access. For instance, system type 412 could comprise a personal computer, a work-based server, an FTP server, or the like.

To highlight how system type 412 may influence the outputted authorization input 414, attention returns to the FTP actor type example discussed above. If the system type 412 upon which the actor wishes to access is a personal computer, then the FTP actor type 410 may be considered less trustworthy. If, however, the system type 412 is an FTP server, then the FTP actor 410 may be more considered more trustworthy. Here it is more likely that the FTP program running on the personal computer is malware, spyware, or the like, while this is less likely to be true if the FTP program runs on an FTP server.

In sum, any combination of these multiple inputs may enter authorization input builder 406, which may create authorization input 414. In some instances, reputation value 114 alone may be input into authorization input builder 406. In these instances, the resulting authorization input 414 is simply equal to the reputation value 114. In other instances, however, reputation value 114 enters authorization input builder 406 along with one or more of the other illustrated inputs. In these instances, the resulting authorization input 414 is based on some combination of these inputted values while still being indicative of an actor's reputation. Whatever its value may be, authorization input 414 may then be provided to an authorization module for comparison to one or more authorization rules or policies, as discussed immediately below.

Authorization Module

Figure 5:
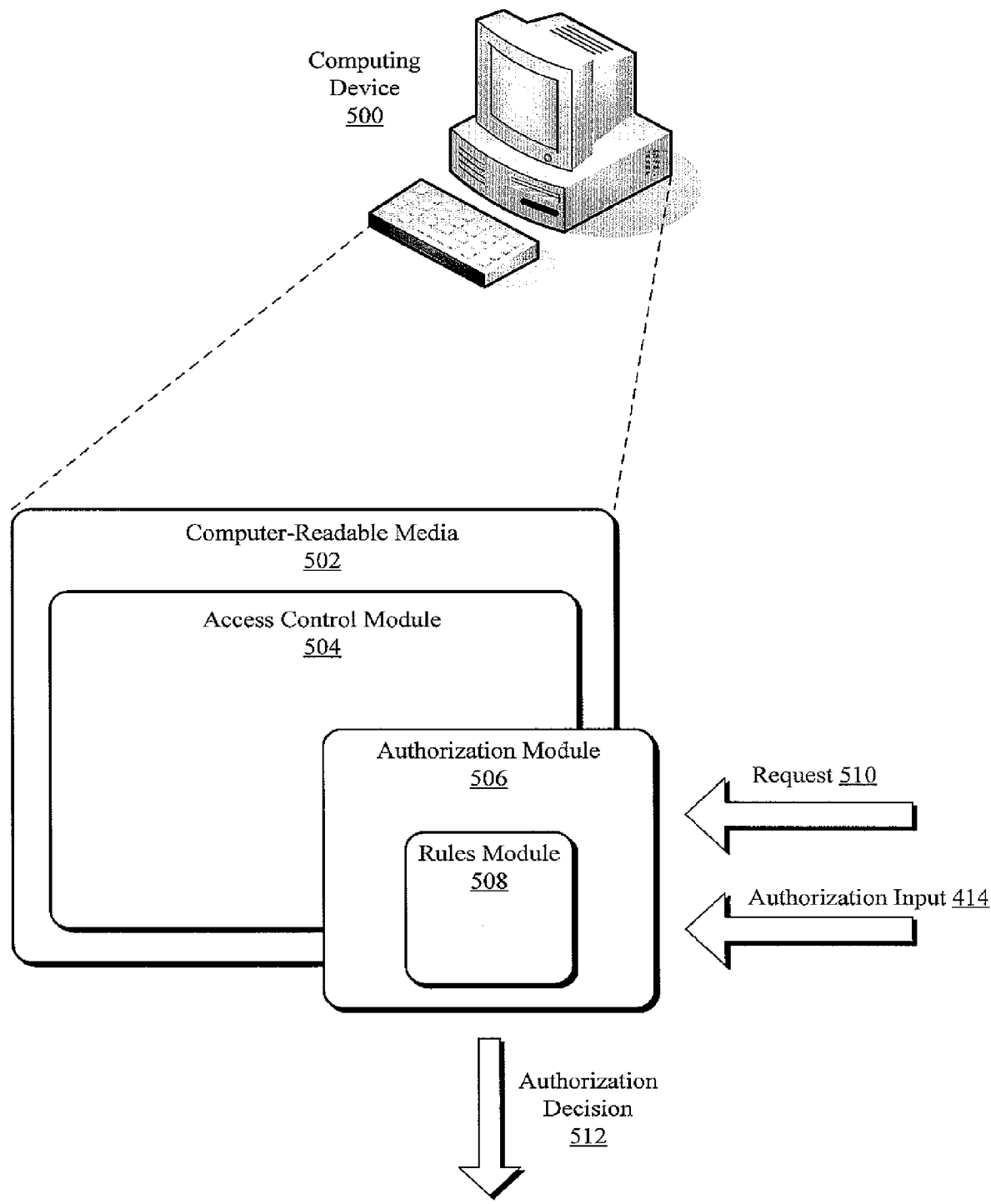
FIG. 5 illustrates an exemplary authorization module configured to receive a request and an authorization input and output an authorization decision.

FIG. 5 illustrates a computing device 500 including one or more computer-readable media 502, which may include an access control module 504. As illustrated, access control module 504 includes an authorization module 506, which in turn includes a rules module 508. Authorization module 506 may function in many of the same ways as described above in regards to authorization module 132. Similarly, rules module 508 may function in many of the same ways as rules module 134.

FIG. 5 also illustrates authorization module 506 receiving a request 510. An actor (e.g., software application) generally sends request 510, which may be similar or identical to local request 120 and/or remote request 122, discussed above. The actor may request to perform some operation (e.g., read, write, delete, open) on an object (e.g., file) located on or accessible by computing device 500. In addition to the request, authorization module 506 may also receive authorization input 414. As discussed above, authorization input 414 is at least in part indicative of a reputation of the actor seeking to perform the operation on the object. Also as discussed above, other components may also provide input to authorization input 414. If, however, authorization input 414 does not include other components, the authorization input 414 simply consists of an actor's reputation value.

Authorization module 506 may compare authorization input 414 against rules created and/or implemented by rules module 508. This comparison may serve to determine whether or not the actor should be granted permission to perform request 510, which may be outputted in the form of authorization decision 512. In accordance with the rules or policies implemented by rules module 508, authorization decision 512 may grant the actor permission to perform the requested authorization, may deny the actor permission, or may prompt the user to decide whether or not to grant the actor permission. Exemplary rules for an installation package actor type may comprise the following:

Do not install if authorization input 414 is "bad"
Prompt user if authorization input 414 is "unknown"
Allow install if authorization input 414 is "good"

In some instances utilizing the above-rule set, authorization input 414 may simply consist of reputation value 114. Here, authorization decision 512 may grant the actor permission where the reputation value is "good", while denying the actor permission where the reputation value is "bad". Furthermore, the authorization decision may prompt the user to decide where the reputation value is "unknown". As this example illustrates, authorization module 506 may make automatic or pre-determined decisions based on the authorization input and the implemented rules, or the authorization module may defer to a user for a final decision.

Furthermore, rules module 508 may contain rules of varying granularity levels. For instance, authorization module 506 and/or rules module 508 may also evaluate the nature of request 510 in making the authorization decision 512. To highlight, the following exemplary list comprises complex authorization rules that rules module 508 may implement when making the authorization decision:

Do not allow install if <1,000 good reports
Do not allow firewall port changes for unknown reputation
Allow registry changes only for "good" software components
Allow *.doc files, but not *.xls files
Allow digitally signed documents, but not unsigned
Prompt user for software installation decision if reputation unknown
Do not play media if reputation vote is less than 5,000 votes
Allow certain actors to only run on device's with certain operating systems
Only allow certain actors to run on servers, but not workstations In embodiments utilizing complex authorization rules, authorization decision 512 may be relatively more robust than embodiments that utilize simpler rules. For instance, the authorization decision may allow an actor to only perform certain operations on certain objects. More specifically, the authorization decision may conclude that a software application may open a user's file, but may not write or delete that file. Furthermore, objects located on or accessible by a client device may have differing security levels that allow increasingly granular authorization decisions. For instance, some objects (e.g., files) on a client device may be labeled "high privacy", while others may be labeled "low privacy". A default label may be given to objects that are not explicitly labeled.

In these implementations, authorization decision 512 may conclude that a software application should only have access to files labeled "low privacy". Furthermore, these authorization decision characteristics may act in unison in some instances. For example, one possible resulting authorization decision may be that a certain software application can only read "high privacy" files on a client device, but may perform read and write operations on "low privacy" files.

Exemplary Implementation

This section describes one possible implementation that utilizes the tools described above. It is specifically noted that this exemplary implementation is but one specific example, which is not intended to limit the scope of the described subject matter or the claims.

With reference to FIG. 1, assume that user 102 downloads an application from remote service provider 110 via network 108 and launches the setup of that application on client device 104. In this instance, the downloaded application may attempt to open a port in a firewall of client device 104. Before access is granted, however, the firewall component calls the access control module 128 to check the reputation of the application requesting the port change. If access control module 128 already has a reputation value 114 cached for this application, then it may use this value. If access control module 128 does not have a reputation value, however, than it may request a reputation value from reputation value builder 112. Of course, access control module 128 may instead request reputation metadata 116 from reputation provider 202 in some instances.

In any event, access control module either receives or builds reputation value 114 for the calling application. Access control module 128 may then use this reputation value—and possibly other components such as system type—to build an authorization input with authorization input builder 130. In the current example, no other components are inputted and the authorization input merely comprises this reputation value. Authorization input builder 130 then provides the reputation-based authorization input to authorization module 132, which compares the reputation-based authorization input of the application against an authorization policy from rules module 134. Here, the reputation value of the application may be labeled "bad" and the authorization policy may state that "bad" applications cannot open ports in the firewall. The application may therefore be prevented from opening the firewall port. Finally, the user may be visually notified of the denial via a user interface.

This exemplary implementation highlights that the overall security and integrity of a client device, its operating system, its users, and its applications may increase with use of the above-described tools. More specifically, security and integrity may increase due to a client device's ability to automatically compare an actor's reputation to a set of authorization rules and use this comparison to determine whether to grant access to the actor, isolate or deny the actor, or run the actor with lower privileges.

CONCLUSION

The above discussion describes tools capable of receiving reputation metadata and building a reputation value for an actor. These tools may also receive a reputation value from a reputation service provider and create authorization input, which may be indicative of the actor's reputation. These tools may also compare the authorization input to an authorization rule for use in deciding whether or not an actor, such as a program, should have permission to perform an operation on an object located on or accessible by a user's computer. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. One or more computer-readable storage devices having computer-readable instructions therein that, when executed by a computing device, cause the computing device to perform acts comprising:

allowing a software application to run on a client computing device, the software application, when running, being an executing software application;

receiving, from the executing software application that is allowed to run on the client computing device, a request to perform a particular operation on a file on the client computing device;

receiving an authorization input, the authorization input including a reputation value indicative of the executing software application's reputation;

comparing the authorization input including the reputation value to an authorization rule;

in response to the comparing, outputting a granular authorization decision pertaining to the requested particular operation on the file on the client computing device, wherein the reputation value comprises a single reputation value aggregated from a plurality of reputation metadata from a plurality of different reputation metadata providers; and wherein the reputation value is based on: (i) input received from a group of human users indicating each human user's experience with the executing software application, and (ii) input received from a group of computing entities indicating each computing entity's review or analysis of the executing software application; wherein:

in an event the authorization input meets or exceeds an authorization rule of a first type, in accordance with the authorization rule of the first type, the granular authorization decision allows the executing software application to perform the particular operation requested to be performed on the file on the client computing device;

in an event the authorization input meets or exceeds an authorization rule of a second type, in accordance with the authorization rule of the second type, the granular authorization decision presents a prompt for user input acceding to the executing software application performing the particular operation requested to be performed on the file on the client computing device; and in an event the authorization input does not meet either the authorization rule of the first type or the authorization rule of the second type, in accordance with a third authorization rule, the granular authorization decision blocks the executing software application from performing the particular operation requested to be performed on the file on the client computing device.

2. The computer-readable storage of claim 1, further comprising making the authorization decision based on the reputation value, a type of the operation requested, and a security level of the object.

3. The computer-readable storage of claim 1 wherein the reputation value indicates that the reputation of the executing software application is good and the authorization decision is to allow the requested operation.

4. The computer-readable storage of claim 1 wherein the authorization decision is to allow the executing software application to perform the requested operation on the file and to not allow another operation on the file.

5. The computer-readable storage of claim 1, wherein the authorization input being received is from an access control module that is independent of a firewall.

6. One or more computer-readable storage devices having computer-readable instructions therein that, when executed by a computing device, cause the computing device to perform acts comprising:
    allowing code to run on a client computing device;
    receiving, from the code that is allowed to run on the client computing device, a request to perform a particular operation on an object on the client computing device;
    receiving an authorization input from an access control module, the authorization input including a single reputation value indicative of the code's reputation, the single reputation value being aggregated from a plurality of reputation metadata from a plurality of different reputation metadata providers, and representing at least:
        reputation metadata input received from a group of human users indicating an experience of the human users with the code, and
        reputation metadata input received from a group of computing entities indicating a review or analysis by the computing entities of the code;
    comparing the authorization input including the reputation value to an authorization rule; and
    in response to the comparing, outputting a granular authorization decision pertaining to the particular requested operation on the object on the client computing device, wherein:
        in an event the authorization input meets or exceeds an authorization rule of a first type, in accordance with the authorization rule of the first type, the granular authorization decision allows the code to perform the particular operation requested to be performed on the object on the client computing device;
        in an event the authorization input meets or exceeds an authorization rule of a second type, in accordance with the authorization rule of the second type, the granular authorization decision presents a prompt for user input acceding to the code performing the particular operation requested to be performed on the object on the client computing device; and
        in an event the authorization input does not meet either the authorization rule of the first type or the authorization rule of the second type, in accordance with a third authorization rule, the granular authorization decision blocks the code from performing the particular operation requested to be performed on the object on the client computing device.

7. The computer-readable storage of claim 6 wherein the code is run on the client computing device.

8. The computer-readable storage of claim 6 wherein the object on the client computing device is a file and the particular requested operation is selected from the group consisting of reading, writing, deleting, and opening the file.

9. The computer-readable storage of claim 6 wherein the code is selected from the group consisting of a software application, a software program, an application, a dynamically linked library, an installation program, a file, a picture, a document, an applet, and an active control.

10. The computer-readable storage of claim 6 wherein the single reputation value indicates that the code's reputation is that of one selected from the group consisting of a software update, an obsolete software, a software no longer supported, a known security vulnerability, a software patch, a document digitally signed by a publisher of the document, and a network address from which the code was obtained.

11. One or more computer-readable storage devices having computer-readable instructions therein that, when executed by a computing device, cause the computing device to perform acts comprising:
    allowing code to run on a client computing device;
    receiving, from the code that is allowed to run on the client computing device, a request to perform a particular operation on an object on the client computing device;
    receiving an authorization input from an access control module, the authorization input including a single reputation value indicative of the code's reputation aggregated from a plurality of reputation metadata from a plurality of different reputation metadata providers, the single reputation value being aggregated at least from:
        reputation metadata input received from a group of human users indicating an experience of the human users with the code, and
        reputation metadata input received from a group of computing entities indicating a review or analysis by the computing entities of the code;
    comparing the authorization input including the reputation value to an authorization rule;
    in response to the comparing, outputting a granular authorization decision pertaining to the particular requested operation on the object on the client computing device; wherein:
        in an event the authorization input meets or exceeds an authorization rule of a first type, in accordance with the authorization rule of the first type, the granular authorization decision allows the code to perform the particular operation requested to be performed on the object on the client computing device;
        in an event the authorization input meets or exceeds an authorization rule of a second type, in accordance with the authorization rule of the second type, the granular authorization decision presents a prompt for user input acceding to the code performing the particular operation requested to be performed on the object on the client computing device; and
        in an event the authorization input does not meet either the authorization rule of the first type or the authorization rule of the second type, in accordance with a third authorization rule, the granular authorization decision blocks the code from performing the particular operation requested to be performed on the object on the client computing device.

12. One or more computer-readable storage devices having computer-readable instructions therein that, when executed by a computing device, cause the computing device to perform acts comprising:
    allowing an actor to run on a client computing device, the actor, when running, being a running actor comprising at least one of: a software program, an application, a dynamically linked library, an installation program, a file, a picture, a document, an applet, or an ActiveX control;
    receiving, from the running actor, a request to perform a particular operation on an object on the client computing device;
    receiving an authorization input, the authorization input including a single reputation value indicative of a reputation of the running actor that is aggregated from a plurality of reputation metadata from a plurality of different reputation metadata providers, wherein the single reputation value is aggregated at least from:

reputation metadata input received from a group of human users indicating experience of the human users with the running actor, and reputation metadata input received from a group of computing entities indicating a review or analysis of the computing entities of the running actor;

comparing the authorization input including the single reputation value to an authorization rule, the authorization rule being one of a plurality of types of authorization rules;

in response to the comparing, outputting a granular authorization decision that controls the requested particular operation on the object on the client computing device, wherein:

in an event the authorization input meets or exceeds an authorization rule of a first type, in accordance with the authorization rule of the first type, the granular authorization decision allows the running actor to perform the particular operation requested to be performed on the object on the client computing device;

in an event the authorization input meets or exceeds an authorization rule of a second type, in accordance with the authorization rule of the second type, the granular authorization decision presents a prompt for user input acceding to the running actor performing the particular operation requested to be performed on the object on the client computing device; and in an event the authorization input does not meet either the authorization rule of the first type or the authorization rule of the second type, in accordance with a third authorization rule, the granular authorization decision blocks the running actor from performing the particular operation requested to be performed on the object on the client computing device.

13. The one or more computer-readable storage as recited in claim 12, wherein in the event in an event the authorization input meets or exceeds an authorization rule of the second type, in accordance with the authorization rule of the second type, the granular authorization decision presents the prompt for user input acceding to the running actor performing the particular operation requested to be performed on the object on the client computing device, and wherein:

responsive to user input acceding to the running actor performing the particular operation requested to be performed on the object on the client computing device, the granular authorization decision allowing the running actor to perform the particular operation requested to be performed on the object on the client computing device;

responsive to user input not acceding to the running actor performing the particular operation requested to be performed on the object on the client computing device, the granular authorization decision blocking the running actor from performing the particular operation requested to be performed on the object on the client computing device; and responsive to not receiving user input acceding to the running actor performing the particular operation requested to be performed on the object on the client computing device, the granular authorization decision blocking the running actor from performing the particular operation requested to be performed on the object on the client computing device.

14. The one or more computer-readable storage as recited in claim 12, wherein the authorization input being received is from an access control module that is independent of a firewall.

* * * * *